(12) United States Patent
Trump et al.

(10) Patent No.: US 11,226,283 B2
(45) Date of Patent: Jan. 18, 2022

(54) SAMPLE CUVETTE

(71) Applicant: STRATEC SE, Birkenfeld (DE)

(72) Inventors: Martin Trump, Pforzheim (DE); Erich Stiess, Karlsruhe (DE); Markus Niermeyer, Pforzheim (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 16/844,066

(22) Filed: Apr. 9, 2020

(65) Prior Publication Data
US 2020/0326272 A1 Oct. 15, 2020

(30) Foreign Application Priority Data

Apr. 12, 2019 (LU) .......................... 101174

(51) Int. Cl.
*G01N 21/03* (2006.01)
*G01N 21/51* (2006.01)

(52) U.S. Cl.
CPC ......... *G01N 21/0303* (2013.01); *G01N 21/51* (2013.01); *G01N 2021/0357* (2013.01);
(Continued)

(58) Field of Classification Search
CPC .. G01N 21/51; G01N 33/54326; G01N 35/10; G01N 33/54393; G01N 33/56983; G01N 1/4077; G01N 2001/4083; G01N 2035/00495; G01N 2035/1018; G01N 21/00; G01N 2021/6439; G01N 21/03; G01N 2333/575; G01N 2333/62; G01N 2333/91188; G01N 2333/96463; G01N 33/5308; G01N 33/56972; G01N 33/573; G01N 33/74; G01N 33/743; G01N 33/80; G01N 33/82; G01N 33/92; G01N 35/025; G01N 35/026; G01N 35/04; G01N 2021/0346; G01N 2021/513; G01N 2021/6421; G01N 2021/6482; G01N 2035/00346; G01N 2035/0094; G01N 2035/0403; G01N 2035/0406; G01N 2035/0412; G01N 21/0303; G01N 21/0332; G01N 21/07; G01N 21/31; G01N 21/35; G01N 21/47; G01N 2800/7095; G01N 33/491; G01N 33/574; G01N 33/6893;
(Continued)

(56) References Cited

U.S. PATENT DOCUMENTS 4,260,581 A * 4/1981 Sakurada ............. G01N 35/021
422/561
4,684,250 A * 8/1987 Kukka ............... G01N 21/0303
356/246
(Continued)

FOREIGN PATENT DOCUMENTS

EP 1909094 A1 4/2008
EP 2466291 A1 6/2012
(Continued)

*Primary Examiner* — Michael P Stafira
(74) *Attorney, Agent, or Firm* — 24IP Law Group USA, PLLC; Timothy Dewitt

(57) ABSTRACT

A cuvette comprising a pyramidal shaped cavity with four sides surfaces, which are connected to each other by curves, wherein side surfaces and curves merge into a transition area that is located above a ring followed by a cone above the bottom of the pyramidally shaped cavity.

13 Claims, 2 Drawing Sheets

(52) U.S. Cl.
CPC ........ *G01N 2021/0382* (2013.01); *G01N 2021/0389* (2013.01); *G01N 2021/513* (2013.01)

(58) Field of Classification Search
CPC ......... G01N 15/1468; G01N 15/1475; G01N 15/1484; G01N 1/04; G01N 1/24; G01N 2001/045; G01N 2021/0321; G01N 2021/0357; G01N 2021/1704; G01N 2021/3595; G01N 2021/392; G01N 2021/399; G01N 2021/4707; G01N 2021/4709; G01N 2021/6419; G01N 2021/6465; G01N 2021/6471; G01N 2035/00554; G01N 2035/0429; G01N 2035/0434; G01N 2035/0437; G01N 2035/0444; G01N 2035/0496; G01N 2035/1076; G01N 21/031; G01N 21/05; G01N 21/1702; G01N 21/274; G01N 221/359; G01N 21/39; G01N 21/59; G01N 21/6454; G01N 21/6456; G01N 21/6486; G01N 21/65; G01N 21/76; G01N 2201/0245; G01N 2201/0415; G01N 2201/0633; G01N 2201/065; G01N 2201/1296; G01N 2333/31; G01N 2333/32; G01N 27/026; G01N 27/3276; G01N 27/4145; G01N 2800/7028; G01N 33/4833; G01N 33/497; G01N 33/533; G01N 33/5436; G01N 33/54386; G01N 33/569; G01N 33/56911; G01N 33/56938; G01N 33/582; G01N 33/66; G01N 35/0092; G01N 35/02; G01N 35/08; G01N 35/085; G01N 35/1004; G01N 35/109; G01N 33/543; G01N 33/4905; G01N 21/84; G01N 2333/75; G01N 33/86; G01N 2035/041; 2035/0465; G01N 35/00; G01N 2021/3144; G01N 2021/3148; G01N 2021/3155; G01N 21/255; G01N 21/3151; G01N 21/3577; G01N 2201/0627; G01N 2201/0634; G01N 221/0636; G01N 2201/12; G01N 33/4925; G01N 33/5304; G01N 21/3504; G01N 1/38; G01N 2021/0382; G01N 15/1404; G01N 2015/1409; G01N 2021/0325; G01N 2021/0389; G01N 21/78; G01N 1/2813; G01N 1/312; G01N 2035/00237; G01N 2035/00504; G01N 2035/00851; G01N 2035/00881; G01N 2035/0097; G01N 2035/0413; G01N 2035/0449; G01N 2035/0455; G01N 2035/0458; G01N 2035/0487; G01N 2035/1032; G01N 2035/1034; G01N 2035/1048; G01N 21/645; G01N 21/6452; G01N 2333/4737; G01N 2333/475; G01N 2333/71; G01N 2333/912; G01N 2333/91205; G01N 2333/9129; G01N 2800/26; G01N 2800/60; G01N 33/48; G01N 33/50; G01N 33/5091; G01N 33/53; G01N 33/5302; G01N 33/54366; G01N 33/56966; G01N 33/57484; G01N 33/6803; G01N 33/94; G01N 35/00732; G01N 35/00871; G01N 35/028; G01N 35/1065; G01N 35/1074; G01N 37/00; G01N 2021/0342; G01N 2021/7786; G01N 21/553; G01N 21/77; G01N 21/87; G01N 2201/062; G01N 33/536; G01N 1/36; G01N 2021/651; G01N 21/253; G01N 21/45; G01N 21/552; G01N 21/6428; G01N 21/6458; G01N 21/648; G01N 27/745; G01N 33/54306; G01N 33/54346; G01N 11/16; G01N 15/0211; G01N 15/10; G01N 15/1459; G01N 2015/0065; G01N 2015/1006; G01N 2015/1037; G01N 2015/1254; G01N 2015/1413; G01N 2015/1418; G01N 2015/1493; G01N 2015/1497; G01N 2021/0378; G01N 2021/6432; G01N 2021/6484; G01N 21/53; G01N 21/532; G01N 21/64; G01N 21/6408; G01N 21/643; G01N 21/6445; G01N 21/763; G01N 21/7703; G01N 21/8507; G01N 2201/061; G01N 2333/11; G01N 2333/165; G01N 33/5088; G01N 35/0098; G02B 21/0012; G02B 21/0032; G02B 21/0076; G02B 21/008; G02B 21/367; G02B 21/0024; G02B 21/0036; G02B 21/0088; G02B 21/082; G02B 21/084; G02B 21/088; G02B 21/16; G02B 21/24; G02B 21/26; G02B 21/368; G02B 26/008; G01J 2003/4424; G01J 3/44

See application file for complete search history.

(56) References Cited

U.S. PATENT DOCUMENTS

| | | | | | |
|---|---|---|---|---|---|
| 5,285,253 | A | * | 2/1994 | Kloth | G01N 21/03 250/576 |
| 5,347,358 | A | * | 9/1994 | Nebe | G01N 21/0303 356/128 |
| 5,658,532 | A | * | 8/1997 | Kurosaki | G01N 35/04 215/371 |
| 5,670,118 | A | * | 9/1997 | Sponholtz | B01L 3/5085 422/119 |
| 2003/0086823 | A1 | * | 5/2003 | Fernando | G01N 21/8507 422/82.06 |
| 2008/0311001 | A1 | * | 12/2008 | Mishima | G01N 21/03 422/68.1 |
| 2010/0182606 | A1 | * | 7/2010 | Prenner | G01N 21/645 356/440 |
| 2010/0231911 | A1 | * | 9/2010 | Fischer | G01J 4/02 356/364 |
| 2011/0164245 | A1 | * | 7/2011 | Eikelmann | B01L 9/52 356/246 |
| 2013/0280024 | A1 | * | 10/2013 | Talmer | G01N 35/04 414/795.4 |
| 2014/0319163 | A1 | * | 10/2014 | Lukhaub | G01N 35/025 221/1 |
| 2017/0307525 | A1 | * | 10/2017 | Langhoff | G01N 21/51 |
| 2018/0284146 | A1 | * | 10/2018 | Hansen | G01N 1/38 |
| 2020/0264050 | A1 | * | 8/2020 | Auner | G01N 21/65 |
| 2021/0041472 | A1 | * | 2/2021 | Limbach | G01N 21/59 |

FOREIGN PATENT DOCUMENTS

| | | | | |
|---|---|---|---|---|
| EP | 2799886 | A1 | | 11/2014 |
| EP | 3266522 | A1 * | 1/2018 | ......... A61B 10/0096 |
| GB | 2547484 | A * | 8/2017 | ......... B01F 13/0809 |
| JP | 2008086115 | A | 4/2008 | |
| KR | 101842639 | B1 * | 5/2018 | ............ G01J 3/0202 |

* cited by examiner

FIG. 3B
FIG. 3A
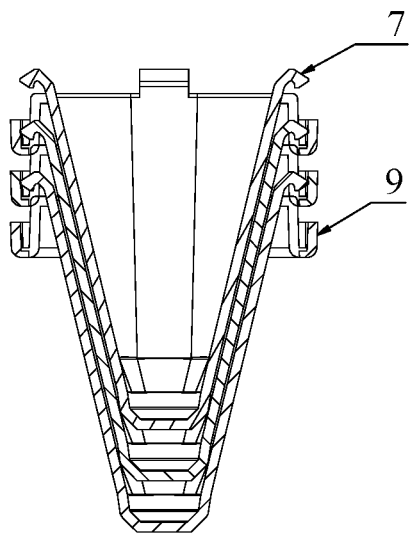
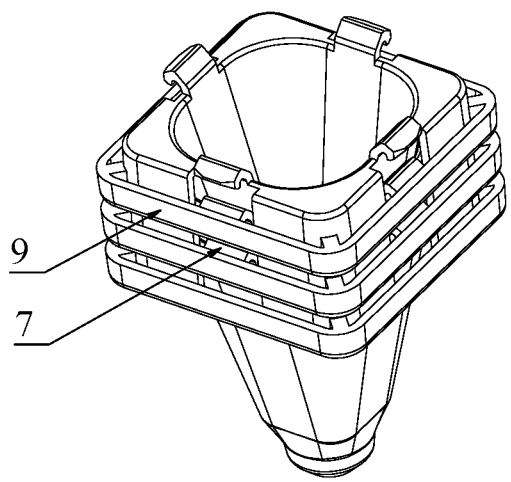
FIG. 4
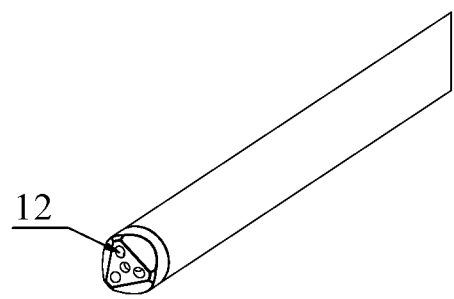
FIG. 5
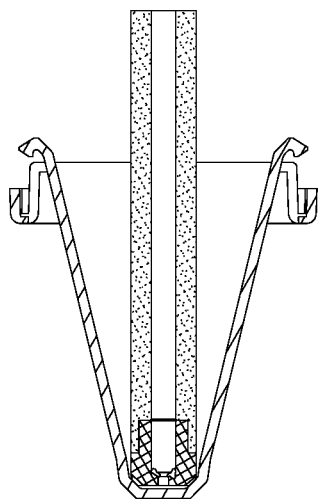

SAMPLE CUVETTE

CROSS-REFERENCE TO RELATED APPLICATIONS

The present application claims priority of Luxembourg Patent Application No. LU 101174 filed on Apr. 12, 2019. The aforementioned application is hereby incorporated by reference in its entirety.

BACKGROUND OF THE INVENTION

Field of the Invention

The invention relates to a cuvette for analysing liquid samples and a method using the cuvette.

Brief Description of the Related Art

Automated analyser systems for use in clinical diagnostics and life sciences are produced by a number of companies. For example, Stratec SE, Birkenfeld, Germany, produces a number of devices for specimen handling and detection for use in automated analyser systems and other laboratory instrumentation.

In current diagnostics, life sciences and biotechnology applications, either manual or automated, a variety of plastics are used in large numbers. Such plastics comprise cuvettes for taking up and processing liquid samples. The processing of liquids in cuvettes may also comprise the analysis of the liquids by observing changes in optical properties caused by chemical reactions. For that reason, cuvettes may be made of transparent materials such as glass or plastics in order to allow light to be transmitted through a liquid contained in the cuvette or the sample to emit light as a consequence of a chemical reaction that has taken place in the cuvette. Emitted light may be measured regarding wavelengths or intensity.

Cuvette is currently used for the preparatory process steps (comp. EP 2 799 886 A1). This cuvette consists of four planar, transparent, tapered surfaces, which are connected by radii and ensure the best possible heat input. At the end there is a floor. Together walls and floor form a cavity. The upper edge of the cuvette has a projection that prevents slippage when stacking. The locking elements, which are located on said edge, catch the edges of other cuvettes and hold them together. The invention relates to a cuvette and a method using cuvettes for the analysis of liquids.

Published European Patent Application No. EP 1 909 094 A1 discloses a cuvette capable of suppressing the complication of the structure of each part of an analyzer and enabling the stirring of a specimen in a short time. The cuvette comprises a first body part positioned on a bottom part side, having inner and outer surfaces of circular shape in horizontal cross section, and receiving a measuring beam and a second body part positioned on an opening side, having an inner surface of non-circular shape in horizontal cross section and an outer surface of circular shape in horizontal cross section.

Published European Patent Application No. EP 2 466 291 A1 teaches a cuvette for photometric measurement of liquids, comprising a body having outer walls and an inner space for receiving liquids, said body comprising an upper part comprising an upper open top portion, an upper front wall, an upper back wall, two upper side walls, said upper walls forming four upper inner edges and an upper open bottom portion with a first substantially rectangular cross-section in a plane A-A, a lower measurement chamber comprising a lower closed bottom portion, a lower front wall, a lower back wall, two lower side walls, said lower walls forming four lower inner edges and a lower open top portion with a second substantially rectangular cross-section in a plane B-B smaller than the first substantially rectangular cross-section in the plane A-A, wherein at least the lower front wall and the lower back wall are at least in part substantially planar and substantially parallel to each other, an abrupt transition zone between the plane A-A and the plane B-B comprising four transition inner edges connecting the four lower inner edges to the upper open bottom portion, and wherein at least in the plane B-B the lower inner edges comprise fillets having a first radius (R1), wherein at least in the plane A-A the upper inner edges (26) comprise fillets having a second radius (R2), the second radius (R2) being larger than the first radius (R1), and wherein the transition inner edges (46) comprise fillets having a gradually increasing radius passing from the sharp edges or the first radius (R1) of the lower inner edges (36) in the plane B-B to the second radius (R2) of the upper inner edges in the plane A-A.

Since only the preparation process can take place in the cuvette, the product must be filled into the analysis vessel, a 96-well plate made of transparent plastic.

The object of the invention is to facilitate the process that can take place in the cuvette, it is only the use of a single vessel necessary, thereby nothing must be transferred, it is saved money, time, effort and material.

SUMMARY OF THE INVENTION

The present invention provides a cuvette for the analysis of liquids, having inner and outer surfaces of pyramidal shape in a horizontal cross section with four sides surfaces, which are connected to each other by curved surfaces, wherein side surfaces and curved surfaces merge towards the bottom end of the cuvette into a transition area that is located above a ring followed by a cone above the bottom of the pyramidally shaped cuvette.

In a further aspect, an upper edge of the cuvette may comprise a surrounding projection.

In a further embodiment of the cuvette, the surrounding projection may comprise at least one locking element.

It is further intended that the at least one locking element may be hook-shaped.

In a further aspect of the cuvette it may be made of a transparent material.

It is further envisaged that the side surfaces may be planar.

In a further embodiment, the cone may have an inclination with respect to the bottom of the cuvette, which may be an angle of 45°.

The ring of the cuvette may be perpendicular to the bottom end of the cuvette.

In a further aspect, the bottom end of the cavity of the cuvette may comprise a concave and/or convex surface representing an optical lens.

It is further intended that the bottom end of the cavity of the cuvette is a prism with refractive and/or deflection properties.

The bottom end of the cavity of a cuvette may in a further embodiment represent a light guide.

The cuvette may further comprise a bottom end of the cavity that is a Fresnel lens.

Another object of the present invention refers to a method of analyzing liquids comprising the steps a. filling a liquid into a cuvette comprising a pyramidal shaped cavity with four sides surfaces, which are connected to each other by curves, wherein side surfaces and curves merge into a transition area that is located above a ring followed by a cone above the bottom of the pyramidally shaped cavity;
b. Mixing the liquid by moving it along the side surfaces connected by curves in the pyramidally shaped cavity;
c. Determining a change in optical properties of the liquid.

The method may further encompass the step that the change in an optical property of the liquid is measured though the side surfaces and/or the bottom of the cuvette Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

FIG. 3A is a bottom perspective view of a stack of cuvettes.

FIG. 3B is a sectional view of a stack of cuvettes.

FIG. 4 shows a suction needle for aspiration of liquids.

FIG. 5 shows the suction needle within a cuvette.

DETAILED DESCRIPTION OF THE INVENTION

Figure 1:
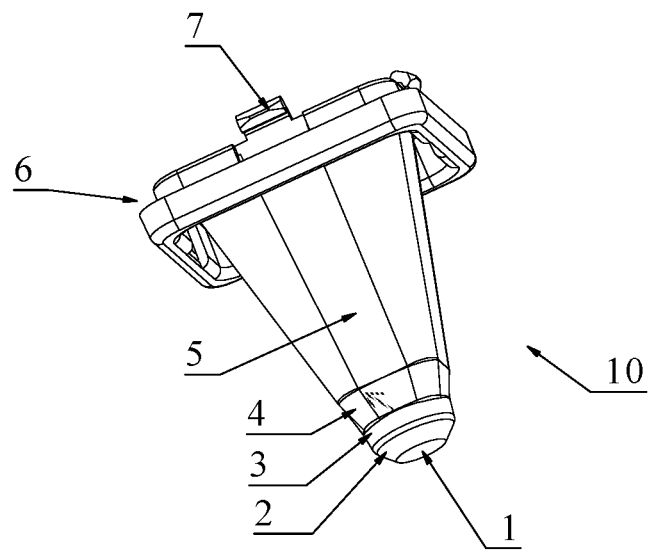
FIG. 1 shows a cuvette with a pyramidal cavity.

The invention provides an object with which the determination/analysis of changes in optical properties will be possible and easier than with cuvettes known from the prior art. Due to the geometry of the cuvette having inner and outer surfaces of pyramidal shape in a horizontal cross section, it is possible that a process (e.g. analysis of liquids or samples present in the cavity of the cuvette) takes place in only one cuvette, rather than in two or more vessels.

By using only one vessel for an analysis, it is possible to increase the throughput, because the product needs no longer to be transferred. In addition, time will be saved, because handling of liquids is reduced. It is also important to mention that less materials or consumables will be necessary which improves cost efficiency.

The cuvette can be made of a special, highly transparent material that can be fabricated with a suitable manufacturing process into very precise, thin, planar surfaces for the optical read-out process. It is an advantage that thereby the reading optics can thus be approximated very close to the medium to be read out/detected. This has a positive effect on the refraction of light, NA (numerical aperture), and makes it possible to increase the sensitivity of the reading process. The results can be clearly differentiated, the SRV (Signal-to-Noise Ratio) is optimized. Another advantage is that the side surfaces allow heat input during the incubation process.

After filling the liquid in the pyramidally shaped cavity, the liquid contained therein must be mixed, this is considerably simplified by the invention due to the curves connecting the plane side surfaces and the round tip, mixing of contents is significantly simplified.

The tip of the cuvette comprises a plane surface, allowing optical measurements through it. A cone is arranged between the plane surface and a ring that may be perpendicular with respect to the plane surface of the bottom/ground of the cuvette. Above the ring and underneath the side surfaces which are connected by the curves, is a transition area arranged. The cone may have a 45° inclination regarding the bottom of the cuvette.

The chemical reaction, mixture of at least two substances in which it comes to a chemical, biological or enzymatic reaction, which is triggered before or during mixing, is easier to observe through the transparent side surfaces and the bottom of the cuvette. It should be noted that the bottom of the cuvette in addition to a normal transparent surface can also have the function of different lenses. These are: a convex and/or concave surface as a lens, a freeform surface as a lens and the execution of a Fresnel lens, an optical lens in volume and mass reduced design.

In addition, the bottom or ground of the cuvette can also serve as a light guide and as a prism with refractive/deflection function for optical axes. These different options allow optical measurements to be made through the ground of the cuvette with below arranged sensors or detectors. But no matter what function the bottom of the cavity has, compulsory requirements are parallelism, surface quality and purity, to obtain error-free measurements through it.

Before the optical observation takes place, the liquid can be handled from the cuvette using a suction needle without scratching the side surfaces of the cuvette because the tip of a suction needle may provide several holes for suctioning the fluid, and may further have a 45° incline in relation to the cone of the cuvette. As a result, the tip can be effectively used to remove a liquid, like a washing buffer from the cavity with almost no residue left and without scratching the cuvette, respectively the bottom of the cuvette. Magnetic beads to which samples are bound may be hold by external magnets at the side walls or in the curves so that a liquid can be removed with a suction needle as described without aspirating the magnetic beads and producing scratches at the plane side surfaces of the pyramidal-shaped cuvette. The ring 3 has a steep angle and serves to pre-center the liquid. This can then be easily sucked off by the shape of the suction needle.

The pyramidal shape of the inner and out surface results in reduction of the outer circumference towards the bottom end of the cuvette. The resulting angle of the side surfaces in relation to a hypothetical vertical or in relation to the horizontal plane of the upper end of the cuvette allows stacking of the cuvettes and the upper edge of the cuvette has a projection, which prevents cuvettes from slipping into each other.

Locking elements located at the top of the edges of the cuvettes can be hooked into the edges of the cuvettes. The snagging of the cuvettes prevents them from falling apart and protects them from dirt entering cuvettes (e.g. dust).

FIG. 1 shows a cuvette 10 with a pyramidally shaped cavity 8 with four sides surfaces 5, which are connected to each other by curves 11. A transition area (4), a ring (3), a cone (2) and the ground (1) of the pyramidally shaped cavity (8) is arranged underneath the side surfaces 5 and curves 11. The upper edge 6 of the cuvette has a projection 9 onto which latching elements 7 are located, which are hook-shaped.

Figure 2A:
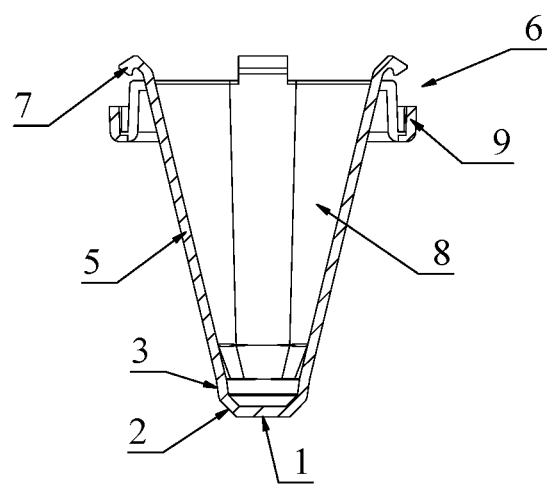
FIGS. 2A and 2B show a sectional view of a cuvette as shown in FIG. 1 in two different section planes.
Figure 2B:
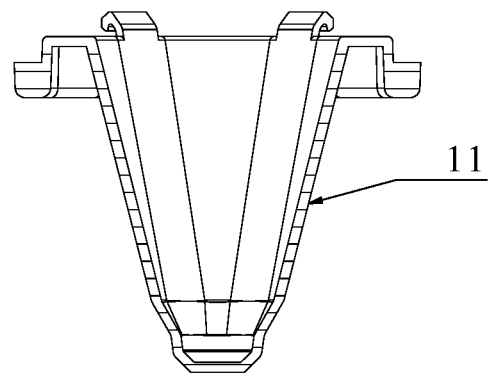

FIGS. 2A and 2B show a cuvette in two section planes. FIG. 2A shows a section through the side surfaces 5, and FIG. 2B a section thorough the curves 11. There are (from top to bottom) in FIG. 2A locking elements 7, the edge 6 with protrusion 9, the side surfaces 5, the ring 3, the cone 2 and the bottom 1 of the cuvette shown. The section plane in FIG. 2B shows that the curves 11 merge into transition area 4.

FIG. 3 shows in its left part a sectional view through the cuvette stack shown in the right part. The locking elements 7 of the upper cuvettes have become entangled with the protrusions 9 of the lower cuvettes.

The right part of FIG. 3 shows a perspective view on a stack of cuvettes. The locking elements 7 of the upper cuvette reach into the protrusions 9 of the lower cuvettes.

FIG. 4 shows a suction needle. The needle is an elongated cylinder that ends with a tip having a 45° incline, comparable to the shape of the cuvette's cone (comp. FIG. 5). The tip of the needle has several holes 12 for sucking off liquids.

FIG. 5 shows a sectional view of a suction needle that is arranged into a cuvette. The suction needle reaches into the pyramidal cavity of the cuvette and its shape is adapted to the cone 2 above the cuvette's ground.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 12 bottom/ground
2 cone
3 ring
4 transition area
5 side surface
6 edge
7 locking elements
8 cavity
9 protrusion
10 cuvette
11 curve
12 hole

What is claimed is:

1. A cuvette for the analysis of liquids, having inner and outer surfaces of pyramidal shape in a horizontal cross section with four sides surfaces, which are connected to each other by curved surfaces, wherein side surfaces and curved surfaces merge towards the bottom end of the cuvette into a transition area that is located above a ring followed by a cone, wherein the transition area, the ring and the cone belong to the side surfaces of the cuvette, above the bottom of the pyramidally shaped cuvette.

2. The cuvette of claim 1, wherein an upper edge of the cuvette comprises a surrounding projection.

3. The cuvette of claim 2, wherein the projection comprises at least one locking element.

4. The cuvette of claim 3, wherein the at least one locking element is hook-shaped.

5. The cuvette of claim 1, wherein the cuvette is made of a transparent material.

6. The cuvette of claim 1, wherein the side surfaces are planar.

7. The cuvette of claim 1, wherein the cone has an inclination with respect to the bottom of the cuvette.

8. The cuvette of claim 7, wherein the inclination has an angle of 45°.

9. The cuvette of claim 1, wherein the ring is perpendicular to the bottom end of the cuvette.

10. The cuvette of claim 1, wherein the bottom end of the cavity of the cuvette comprises a concave and/or convex surface representing an optical lens.

11. The cuvette of claim 1, wherein in that the bottom end of the cavity of the cuvette is a prism with refractive and/or deflection properties.

12. The cuvette of claim 1, wherein the bottom end of the cavity of the cuvette is a light guide.

13. The cuvette of claim 1, wherein the bottom end of the cavity of the cuvette is a Fresnel lens.

* * * * *